(12) United States Patent  (10) Patent No.: US 8,277,292 B2
Whelan  (45) Date of Patent: Oct. 2, 2012

(54) INLINE HANDHELD POWER TOOL

(76) Inventor: Patrick J. Whelan, Troutdale, OR (US)

( * ) Notice: Subject to any disclaimer, the term of this patent is extended or adjusted under 35 U.S.C. 154(b) by 309 days.

(21) Appl. No.: 12/650,407

(22) Filed: Dec. 30, 2009

(65) Prior Publication Data

US 2010/0105301 A1    Apr. 29, 2010

Related U.S. Application Data

(63) Continuation-in-part of application No. 12/109,808, filed on Apr. 25, 2008, now abandoned.

(60) Provisional application No. 60/927,113, filed on Apr. 30, 2007.

(51) Int. Cl.
*B24B 23/00* (2006.01)

(52) U.S. Cl. .................................. 451/359; 451/295

(58) Field of Classification Search .................. 451/359, 451/358, 294, 295
See application file for complete search history.

(56) References Cited

U.S. PATENT DOCUMENTS

| | | | |
|---|---|---|---|
| D333,766 S | 3/1993 | Albert et al. | |
| 5,384,985 A | 1/1995 | Jacobsson | |
| 5,551,156 A | 9/1996 | Elmer | |
| 5,730,561 A | 3/1998 | Wambeke | |
| 6,386,961 B1 | 5/2002 | Cureton | |
| 6,592,307 B2 * | 7/2003 | Hsieh | 409/139 |
| 6,632,128 B2 | 10/2003 | Berger et al. | |
| 6,669,542 B1 | 12/2003 | Walz et al. | |
| 6,716,095 B1 * | 4/2004 | Hsu et al. | 451/358 |
| 6,860,260 B2 | 3/2005 | Lin | |
| 6,981,907 B1 | 1/2006 | Korinek et al. | |
| 7,014,548 B1 | 3/2006 | Lin | |
| 7,530,885 B2 * | 5/2009 | Sun et al. | 451/358 |
| 2003/0000716 A1 | 1/2003 | Hofmann et al. | |
| 2006/0276114 A1 | 12/2006 | Gallagher et al. | |

FOREIGN PATENT DOCUMENTS

| | | |
|---|---|---|
| EP | 0 642 306 B1 | 3/1996 |
| JP | 6-21840 U | 3/1994 |
| JP | 7-314314 A | 12/1995 |
| KR | 20-0367272 Y1 | 11/2004 |
| WO | WO 94/05157 A1 | 3/1994 |
| WO | WO 94/12325 A1 | 6/1994 |

OTHER PUBLICATIONS

International Search Report dated Nov. 30, 2009 for International Application No. PCT/US2009/041689.

* cited by examiner

*Primary Examiner* — Robert Rose
(74) *Attorney, Agent, or Firm* — Marger Johnson & McCollom PC (57) ABSTRACT

A powerhead for a hand held power tool includes a powerhead assembly, the powerhead assembly being operably couplable to a hand held motive source, the powerhead assembly having a rotatable implement, the implement being selectively rotated by the motive source when the motive source is operably coupled to the powerhead assembly, the implement further being rotatable about an implement axis, the implement axis being disposed transverse to a powerhead assembly longitudinal axis, the implement axis intersecting the powerhead assembly longitudinal axis. A hand held power tool and a powerhead of forming a powerhead for a hand held power tool are further included.

18 Claims, 8 Drawing Sheets

INLINE HANDHELD POWER TOOL

CROSS-REFERENCE TO RELATED APPLICATIONS

The present application is a continuation-in-part of U.S. application Ser. No. 12/109,808, filed Apr. 25, 2008, which is a non-provisional application of U.S. Provisional Application No. 60/927,113, filed Apr. 30, 2007, both of which are incorporated herein in their entirety by reference.

TECHNICAL FIELD

This disclosure relates to handheld power tools and, more particularly, to handheld power tools for cutting and grinding workpieces.

BACKGROUND

Handheld power tools are used for many applications. For instance, they can be used to cut a workpiece. Cutting a workpiece can include cutting across the surface of a generally planar workpiece, cutting off an end of a length of workpiece, and so forth. Workpieces may comprise materials such as wood, metal, plastic, glass, and so forth.

Handheld power tools can also be used to grind a workpiece. Grinding involves the removal of material from a workpiece surface by abrasion. Grinding a workpiece can produce smooth or fine surface finishes. Another application of grinding includes producing channels, slots, and grooves in a surface of a workpiece.

A prior art angle grinder is one example of a handheld power tool that is used for cutting and grinding. An angle grinder includes an abrasive rotatable implement rotatably mounted to a powerhead assembly at the end of a motive source. The housing of the motive source often serves as a handle. Typically, the abrasive rotatable implement is coupled to a gearbox and driven by an electric motor, AC or DC, or compressed air. Electric motors can be supplied with electric energy via either an external power source or a battery, such as a rechargeable battery.

In typical prior art angle grinders, the abrasive rotatable implement is offset from a longitudinal axis of the motive source and/or set at an angle to a longitudinal axis of the motive source. The axis of rotation of the implement does not intersect the longitudinal axis. The offset can disadvantageously limit the inherent stability of an angle grinder and, as a result, its functionality. For example, the offset and/or angle of the abrasive rotatable implement makes cutting or grinding along a straight line unstable. Further, the offset and/or angle of the abrasive rotatable implement makes aligning the rotatable implement with an intended location of a cut, cutoff, or grinding area difficult. Thus, the accuracy and precision of machining a workpiece can be diminished by an abrasive rotatable implement that is offset or angled. Additionally, offset grinders are generally bulky and hard to maneuver in smaller confined spaces.

The following U.S. Patent and U.S. Patent Publication references provide examples of grinding tools and are expressly incorporated herein by reference for all purposes: D330496, D333766, U.S. Pat. Nos. 5,384,985, 6,669,542, 6,860,260, 6,981,907, 6,386,961, 7,014,548, and 2006/0276114.

BRIEF SUMMARY

Embodiments of the present invention substantially meet the aforementioned needs of the industry.

A powerhead for a hand held power tool includes a powerhead assembly, the powerhead assembly being operably couplable to a hand held motive source, the powerhead assembly having a rotatable implement, the implement being selectively rotated by the motive source when the motive source is operably coupled to the powerhead assembly, the implement further being rotatable about an implement axis, the implement axis being disposed transverse to a powerhead assembly longitudinal axis, the implement axis intersecting the powerhead assembly longitudinal axis. Additional embodiments include a hand held power tool and a method of forming a powerhead for a hand held power tool.

DETAILED DESCRIPTION OF THE ILLUSTRATED EMBODIMENTS

Figure 1A:
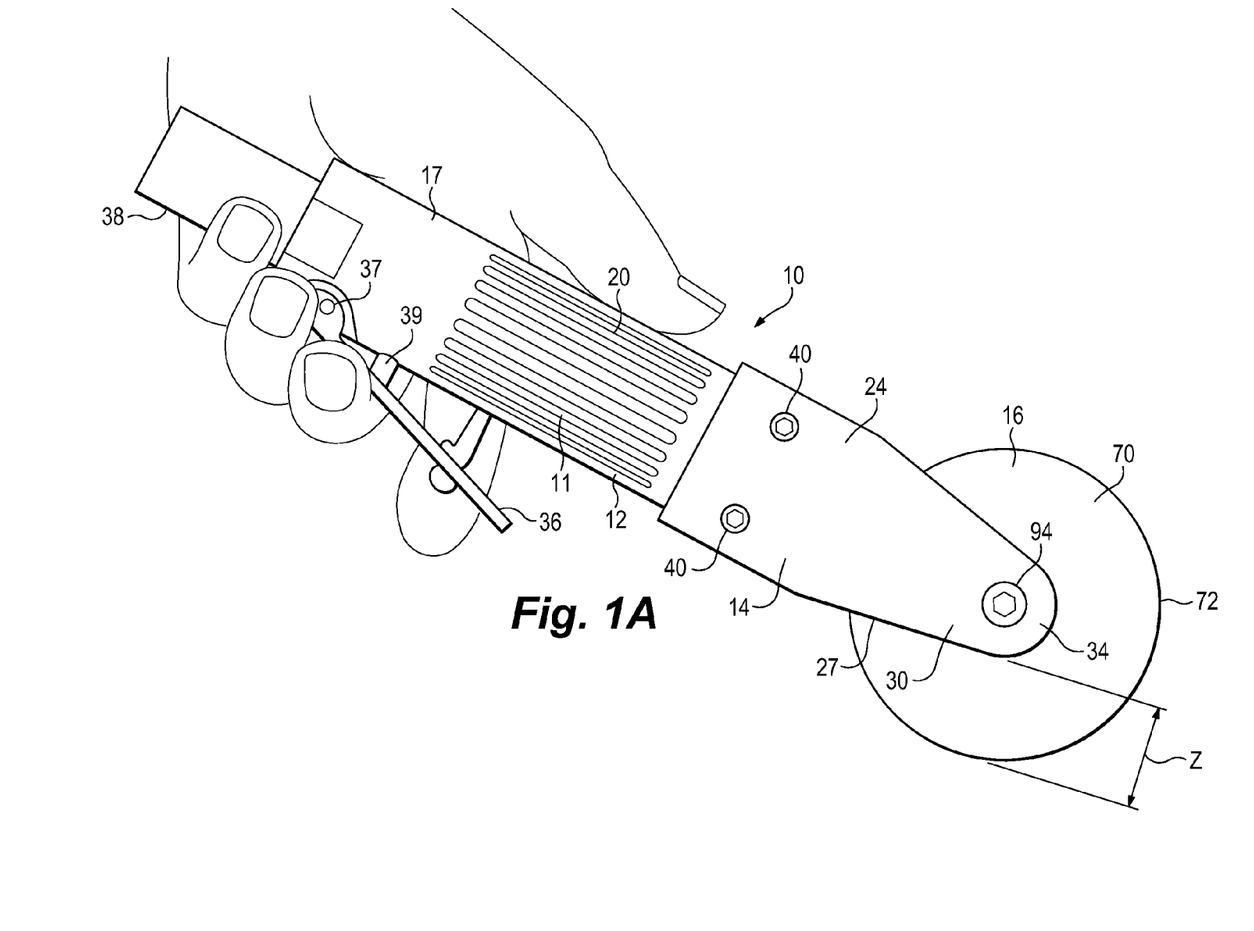
FIG. 1A illustrates a side plan view of a handheld power tool according to one embodiment.
Figure 1B:
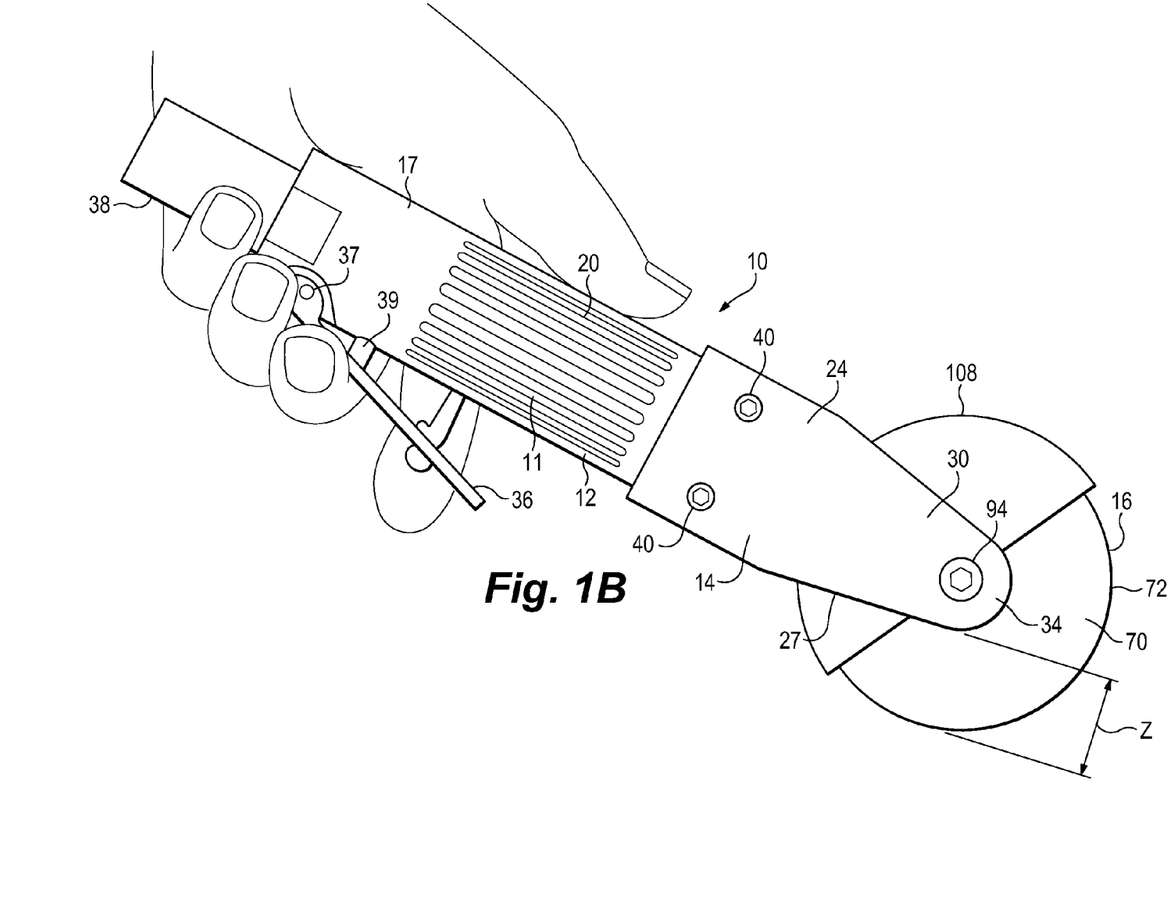
FIG. 1B illustrates a side plan view of a handheld power tool according to another embodiment.
Figure 1C:
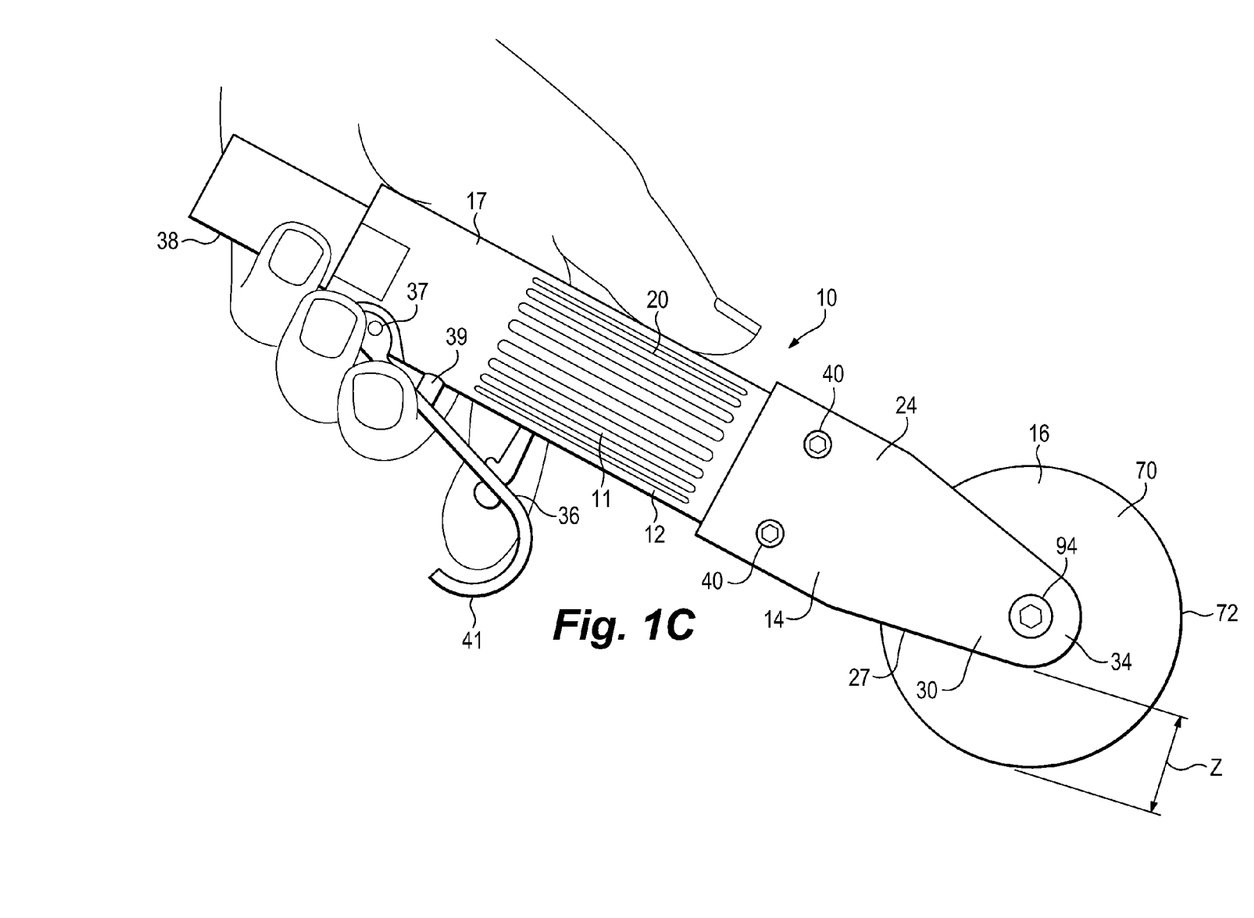
FIG. 1C illustrates a side plan view of a handheld power tool according to yet another embodiment.

As shown in FIGS. 1A-1C, a handheld power tool is depicted generally at 10. The handheld power tool 10 may include a motive source 12, a powerhead assembly 14 couplable at one end of the motive source 12, and a rotatable implement 16 mounted to the powerhead assembly 14. Referring specifically to FIG. 1B, the tool 10 may further include a guard 108 mounted within the powerhead assembly 14 and adjacent to the rotatable implement 16. Generally, the guard 108 is a safety device that prevents or reduces inadvertent contact of the rotatable implement 16 as it is rotating, such as by a user or by other objects that may otherwise obstruct or interfere with the rotation of rotatable implement 16 during operation of the tool 10.

The motive source 12 preferably functions as an enclosure or housing 11 for internal energizing components (not shown) for imparting rotating motion to the rotatable implement 16. A handle portion 17, comprising the external margin of the motive source 12 housing is preferably sized and shaped to accommodate a user's hand. Any suitable material, such as metal or plastic, may be used to form the housing 11 of the motive source 12

The motive source 12 may coupled to a power source 38. In some embodiments, the power source 38 is a pneumatic coupler, an electric wire (e.g., pluggable into a 110 or 220 VAC outlet), or a battery pack (e.g., a rechargeable DC battery pack).

The handle portion 17 is shown to include indentations 20 to facilitate secure gripping of handle portion 17. Other features may additionally or alternatively be used, such as a rubber sleeve and/or a differently textured surface, to facilitate electrical insulation and/or secure gripping of handle portion 17 or any other region of motive source 12.

The motive source 12 preferably includes a trigger 36 that is pivotally mounted on pivot 37. The trigger 36 is preferably biased in the neutral state, as depicted in FIG. 1A. Rotating the trigger 36 towards the housing 11 causes the underside margin of the trigger 36 to compress the actuator 39. In compression, actuator 39 serves to actuate the internal energizing components of the motive source 12, thereby imparting rotary motion to the rotatable implement 16. In the embodiment of FIG. 1C, the trigger 36 terminates at the distal end thereof in finger sized hook 41. The hook 41 assists in preventing the hand of the user from advancing to come into contact with the implement 16.

Powerhead assembly 14 is shown coupled to one end of motive source 12 and serves as a mount or receiver for rotatable implement 16. Powerhead assembly 14 may also house internal components, as described in more detail below. The powerhead assembly 14 may radially extend outward relative to the surface of motive source 12, such as to distinguish the powerhead assembly 14 from motive source 12. Distinguishing powerhead assembly 14 from motive source 12 may provide safety to a user by delineating the boundary of handle 17, which is spaced from rotatable implement 16.

Figure 2:
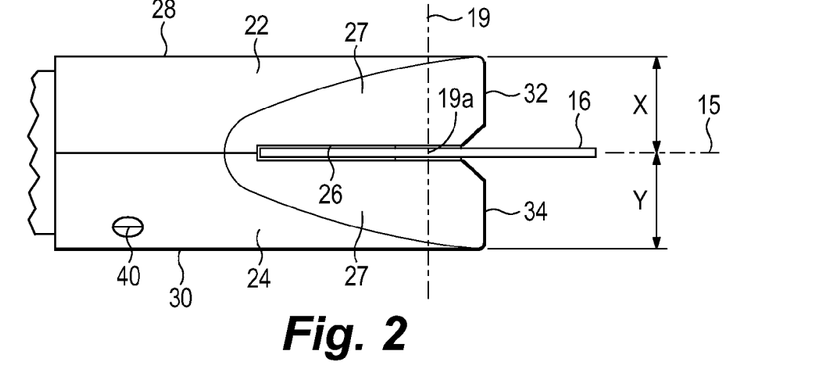
FIG. 2 illustrates a top plan view of the handheld power tool shown in FIG. 1A.
Figure 3:
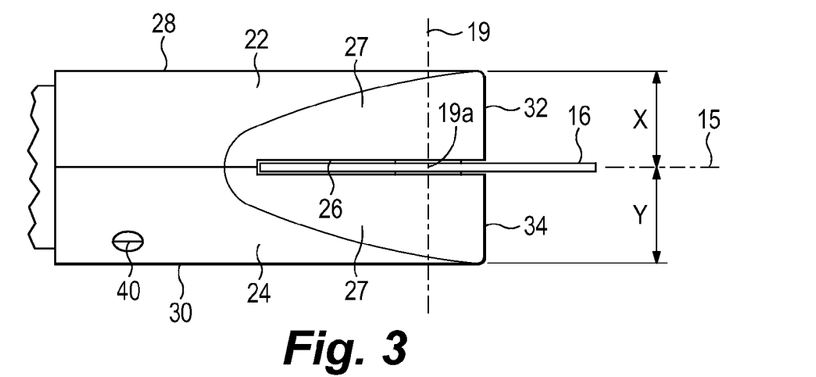
FIG. 3 illustrates a top plan view of the handheld power tool shown in FIG. 1A according to another embodiment.

As also shown in FIG. 2, powerhead assembly 14 may rotatably support rotatable implement 16, such as a saw blade, other cutting blade or an abrasive disc, in an "inline" position extending from the end of powerhead assembly 14, the plane of the rotatable implement 16 intersecting the longitudinal axis 15 of the motive source 12 and the center 19a of the axis of rotation 19 of the rotatable implement 16 being coincident with the longitudinal axis 15. In other words, the rotatable implement 16 is generally aligned with the longitudinal axis 15 of the cylindrical motive source 12 and located within the outer dimensions of the powerhead assembly 14 and/or the motive source 12, rather than being offset therefrom.

With reference to FIG. 2, powerhead assembly 14 is shown to include two shoulders 22 and 24 forming a powerhead housing defining a slit or slot 26, within which rotatable implement 16 can be mounted. Guide surface 27 is formed in powerhead assembly 14 adjacent the rotatable implement 16 and distal to motive source 12. The guide surface 27 may be formed to have different depths, angles of inclination, and degree of tapering. Guide surface 27 may provide a surface on which to support and slide tool 10 along a workpiece as it engages in cutting or grinding. Different configurations of the guide surface 27 may provide different types of supporting and sliding performance.

Powerhead assembly 14 may facilitate precision, accuracy, and stability while the tool is deployed and rotatable implement 16 is used to cut and/or grind a workpiece. For example, outside edges 28 and 30 of powerhead assembly 14 (which also form the outside edges of shoulders 22 and 24) provide generally flat surfaces that can be used to abut a guide surface or fence parallel to an intended cut. Thus, outside edges 28 and 30 can promote straight cuts when the tool is used in coordination with a fence, such as by pressing the tool against the fence and drawing the tool along the surface of the workpiece. As shown in FIG. 2, the surface of rotatable implement 16 is offset from edge 28 by a distance indicated as X, and offset from edge 30 by a distance indicated as Y. As such, in practice, a user can orient a fence or straight edge the distance X or Y from an intended cut, and then abut edge 28 or 30 against the fence and direct tool 10 longitudinally along the straight edge to produce a straight cut.

In the embodiment shown in FIGS. 1A-4, the distance X from rotatable implement 16 to outside edge 28 is the same as the distance Y from rotatable implement 16 to outside edge 30. However, other embodiments may be configured such that the distances X and Y are different. In other words, in other embodiments, the rotatable implement 16 need not be aligned with a central axis of the cylindrical motive source 12, but may be slightly offset therefrom but still parallel thereto. In still other embodiments, the configuration of the powerhead assembly 14 may be such that distances X and/or Y can be selectively changed, such as by sliding out an extender member from power assembly 14 or attaching an extension member to power assembly 14. Note that the lengths X and Y can be different while still maintaining rotatable implement 16 inline with motive source 12.

Embodiments in which length X differs from length Y may provide convenience to a user. For example, in situations where two different intended cuts correspond to the unique distances X and Y from a fence, both intended cuts can be made with tool 10 without repositioning the fence. This can be accomplished merely by rotating tool 10 by 180 degrees such that the opposite outside edge abuts the fence which switching between intended cuts.

Moreover, shoulders 22 and 24 may facilitate precision, accuracy, and stability by providing lateral stability while cutting. The lateral stability imparted by shoulders 22 and 24 may counteract any tendency to twist that a rotary cutting tool may exhibit. Ends 32 and 34 of shoulders 22 and 24, respectively, may support tool 10 from the workpiece on both sides of rotatable implement 16 as tool 10 cuts in a longitudinal direction. Rounded ends 32 and 34 may initially be brought into contact with a workpiece as rotatable implement 16 cuts into the workpiece. Once in contact with the workpiece, ends 32 and 34 may support tool 10 on both sides of rotatable implement 16 by sliding along the workpiece during the cut. Ends 32 and 34 may be chamfered near the rotatable implement 16 (as exemplarily shown in FIG. 2) or may be unchamfered near the rotatable implement 16 (as exemplarily shown in FIG. 3).

With reference to FIGS. 1A-1C, a distance Z between the outer surface of end 34 (and end 32, see FIG. 4) and the bottom of the peripheral edge of rotatable implement 16 may define a cut depth. The cut depth may be set or modified by changing distance Z, either by using a different sized rotatable implement 16 or modifying the size of ends 32 and 34. Ends 32 and 34 can be formed in a variety of different sizes to facilitate different cut depths. In some examples, different shoulder pieces are provided to allow different cut depths. Optionally, although not shown, some embodiments may include additional structure configured to allow selective adjustment of the cut depth, for example by supporting the powerhead assembly 14 at a desired height relative to a workpiece surface.

Another example of how powerhead assembly 14 facilitates precision, accuracy, and stability occurs during grinding. Shoulder 22 or 24 can be used as a pivot point when bringing rotatable implement 16 into contact with a workpiece. Using shoulder 22 or 24 as a pivot point allows a user to more precisely introduce rotatable implement 16 to the workpiece by pivoting tool 10 about the pivot point.

Figure 5:
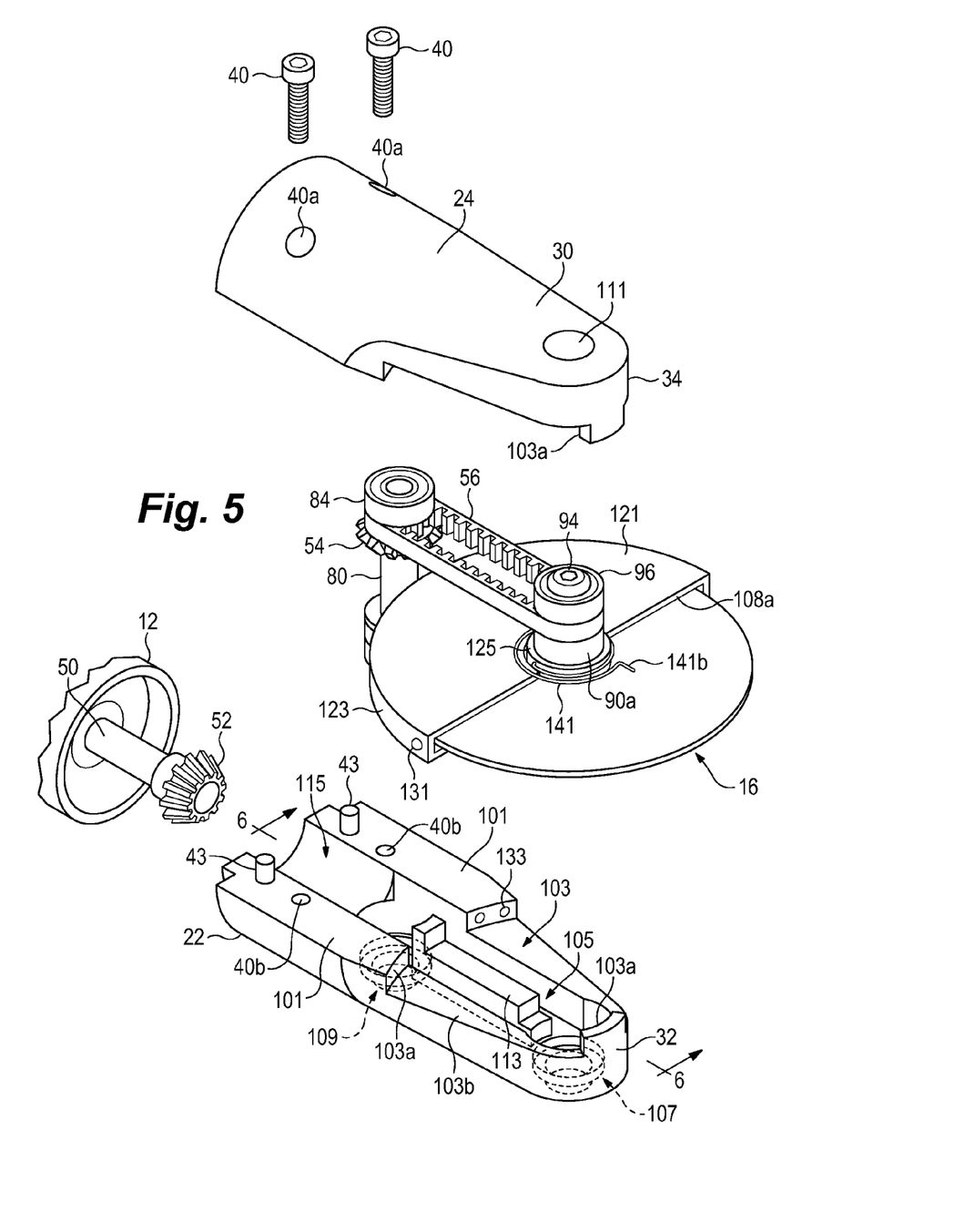
FIG. 5 illustrates a perspective exploded view of the powerhead assembly shown in FIG. 1B.
Figure 6:
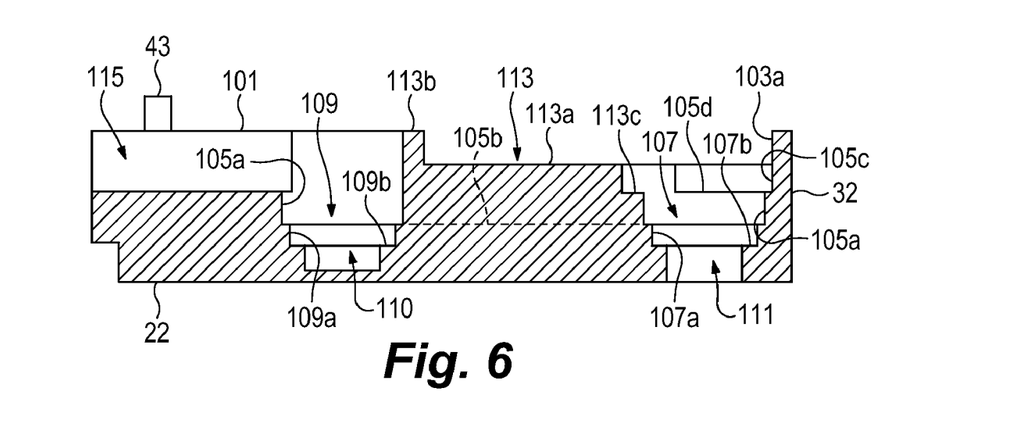
FIG. 6 illustrates a side cross-section view of the powerhead assembly, taken along line 6-6 shown in FIG. 5.

Tool 10 may be powered to rotate rotatable implement 16 by any suitable means, including pneumatically, electrically, mechanically, and so forth. For example, the embodiment shown in FIG. 1A may be pneumatic and, thus, powered by compressed air. Compressed air is introduced to a pneumatic cylinder (not shown) in motive source 12 via the power source 38 (e.g., provided as an inlet port having an air boss). The pneumatic cylinder converts the energy contained in the compressed air into rotational motion of an output shaft 50, which is shown in FIGS. 5 and 6 and rotatable implement 16 discussed in more detail below. In examples where tool 10 is powered by electricity, an electric motor is typically included in motive source 12 to drive output shaft 50 and the power source 38 may be provided as a 110 or 220 VAC cord or a rechargeable DC battery. In other examples, chemical means, such as gasoline, may be used in conjunction with an engine in motive source 12 to mechanically drive output shaft 50.

Powered rotation of rotatable implement 16 may occur selectively by pivoting a trigger 36 coupled to motive source 12. Tool 10 may be configured to rotate rotatable implement 16 at a desired rate. For example, the pictured embodiment is operable at approximately 22,000 revolutions per minute, but may also be configured to rotate rotatable implement 16 faster or slower depending on a given application. Other embodiments may be configured to rotate a rotatable implement at any desired rate.

Figure 7:
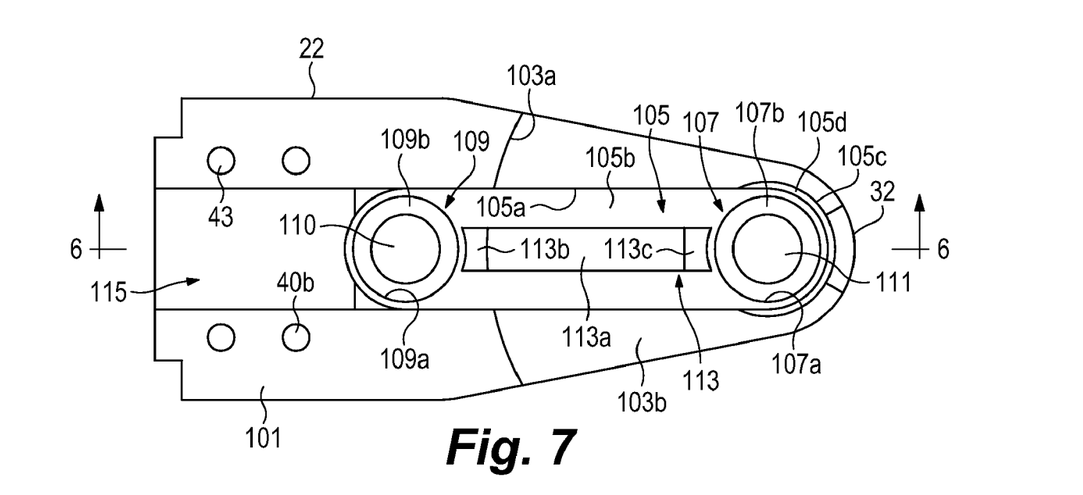
FIG. 7 illustrates a top plan view of a shoulder in the powerhead assembly shown in FIG. 5.
Figure 8:
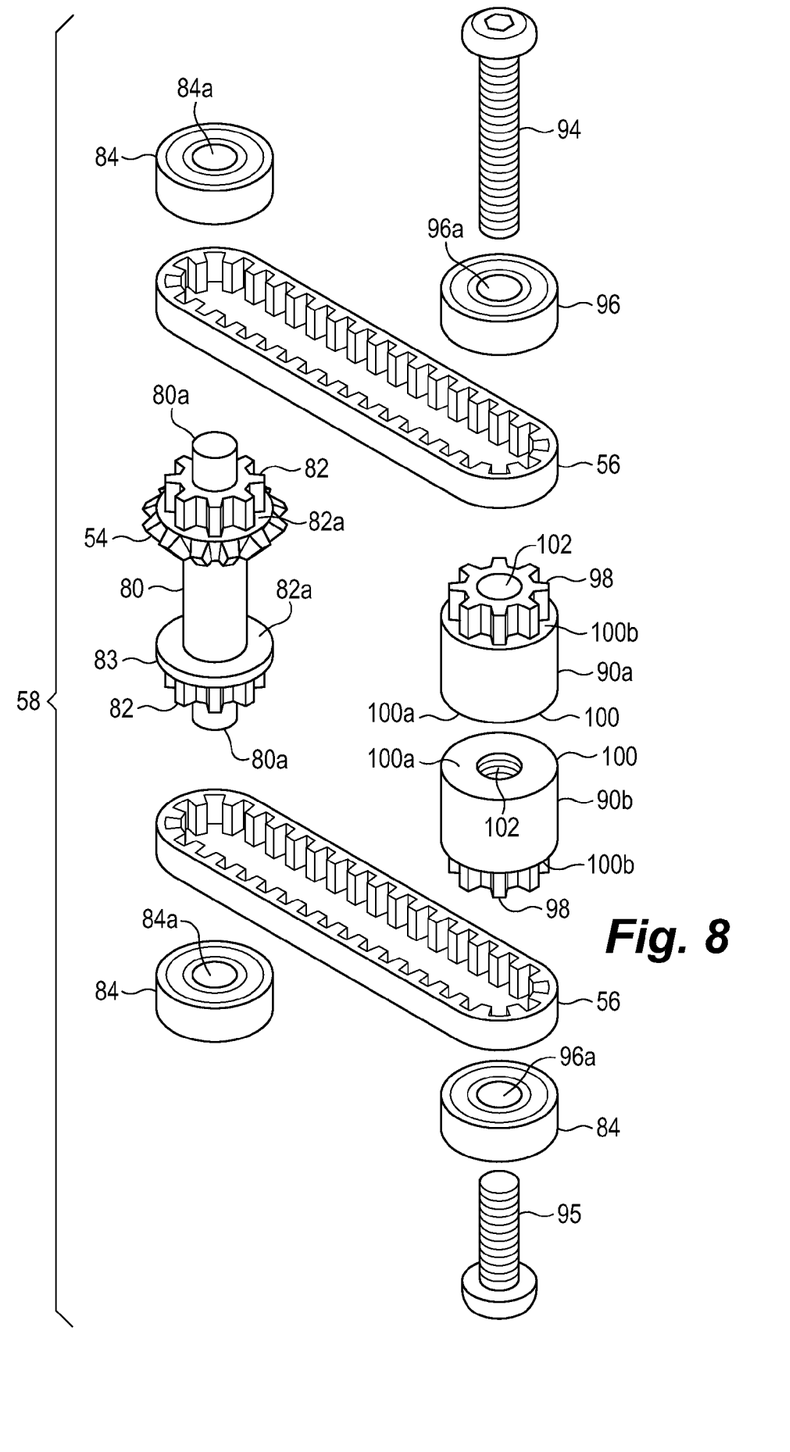
FIG. 8 illustrates a perspective exploded view of the drive assembly shown in FIG. 5.

With reference to FIGS. 5 and 8, tool 10 is shown to include a drive assembly 58 to drive rotation of rotatable implement 16 when the output shaft 50 of the motive source 12 is rotated. As shown in FIGS. 5-7, each of the shoulders 22 and 24 is configured to receive a portion of the drive assembly 58. Thus, when the shoulders 22 and 24 are coupled together, the drive assembly 58 is securely retained between the shoulders 22 and 24. In one embodiment, the shoulders 22 and 24 are coupled together by fasteners 40 (e.g., screws, bolts, etc.). As exemplarily illustrated, fasteners 40 may be inserted through corresponding threaded bores 40a extending through shoulder 24 and into corresponding bores 40b formed in shoulder 22. Alignment pins or pegs 43 may extend from, for example, the shoulder 22 to be received by corresponding alignment bores (not shown) formed in the shoulder 24. When coupled together, the shoulders 22 and 24 form a toolhead that is structured to attach to the motive source 12. The drive assembly 58 may thus be made accessible by removing or loosening fasteners 40. A suitable tool, such as an Allen wrench or blade screwdriver, may be used to tighten or loosen fasteners 40.

In the example embodiment shown in FIGS. 5-7, each of the shoulders 22 and 24 includes a mating surface 101 made to contact each other when the shoulders 22 and 24 are coupled together (e.g., by fasteners 40). Each of the shoulders 22 and 24 further includes a slot trench 103, a belt recess 105, a distal bearing recess 107, a proximal bearing recess 109, a supplemental recess 110 and an access opening 111. Each of the shoulders 22 and 24 may further include an output shaft recess 115 configured to receive a portion of the motive source 12 (e.g., an output shaft 50 and first gear 52).

The slot trench 103 extends away from the mating surface 101 and is defined by sidewalls 103a and a terminal surface 103b. When the shoulders 22 and 24 are coupled together, the slot trenches 103 form the aforementioned slot 26 within which the rotatable implement 16 is mounted. In the illustrated embodiment, the terminal surfaces 103b of each of the shoulders 22 and 24 form opposing sides of the slot 26.

The belt recess 105 extends from the mating surface 101 beyond the terminal surface 103b of the slot trench 103 and is defined by sidewall 105a and a terminal surface 105b. Thus, the belt recess 105 adjoins and communicates with the slot trench 103. As exemplarily illustrated, the belt recess 105 further includes a recessed sidewall 105c and a recessed terminal surface 105d. The recessed sidewall 105a extends from the terminal surface 103b of the slot trench 103. In other embodiments, however, the belt recess 105 does not include the recessed sidewall 105c and a recessed terminal surface 105d.

The distal bearing recess 107 extends from the terminal surface 105b of the belt recess 105 and is defined by a sidewall 107a and a terminal surface 107b. Thus, the distal bearing recess 107 communicates with the belt recess 105.

The proximal bearing recess 109 extends from the terminal surface 105b of the belt recess 105 and is defined by a sidewall 109a and a terminal surface 109b. Thus, the proximal bearing recess 109 communicates with the belt recess 105.

The supplemental recess 110 extends from the terminal surface 109b of the proximal bearing recess 109 into the shoulder and does not intersect the exterior surface of the shoulder. In another embodiment, however, the supplemental recess may extend through the shoulder to communicate the external environment.

The access opening 111 extends from the terminal surface 107b of the distal bearing recess 107 through the shoulder to the exterior surface of the shoulder. Thus, the access opening 111 communicates with the distal bearing recess 107 and the environment external to the corresponding shoulder.

An island 113 is disposed within the belt recess 105 of each of the shoulders 22 and 24. As exemplarily shown, the island 113 extends continuously along the terminal surface 105b of the belt recess 105 between the sidewalls 107a and 109a of the distal bearing recess 107 and proximal bearing recess 109, respectively. Longitudinal ends of the island 113 may be set slightly apart from the sidewalls 107a and 109a of the distal bearing recess 107 and proximal bearing recess 109, respectively. As exemplarily shown, the island 113 includes a slot trench-forming surface 113a, a mating surface 113b and a recessed surface 113c. The slot trench-forming surface 113a is at least substantially coplanar with the terminal surface 103b of the slot trench 103. The mating surface 113b is at least substantially coplanar with the mating surface 101 of the corresponding shoulder. The recessed surface 113c is at least substantially coplanar with the recessed terminal surface 105d of the belt recess 105. It will be appreciated that the island 113 may be configured differently than shown. For example, the island 113 may be divided into multiple islands to save material costs. In another example, longitudinal ends of the island 113 may coincide with the sidewalls 107a and 109a of the distal bearing recess 107 and proximal bearing recess 109, respectively.

As will be discussed in greater detail below, a drive assembly 58 according to the embodiment illustrated in FIG. 8 includes components such as a drive shaft 80 including a pair of gear portions 82, a pair of belts 56, a pair of proximal bearings 84, a split-arbor including a pair of arbor halves 90, a pair of distal bearings 96, a first bolt 94 and a second bolt 95. Within the fastened shoulders 22 and 24 the belt recess 105, distal bearing recesses 107, proximal bearing recesses 109, supplemental recesses 110 and access openings 111 define an interior space dimensioned and configured to permit operation of the drive assembly 58 (e.g., via rotation of the drive shaft 80, rotation of the split-arbor, lateral motion of the belts 56, etc.) while restricting excessive shift of the components of the drive assembly 58, even when the rotatable implement 16 is not present. The island 113 also helps to prevent movement of the split-arbor between the shoulders 22 and 24 along, for example, the longitudinal axis 15 of the motive source 12.

For example, referring back to FIGS. 5-7, within each of the shoulders 22 and 24, the proximal bearing recess 109 is configured to receive a corresponding one of the pair of proximal bearings 84, the distal bearing recess 107 is configured to receive a corresponding one of the pair of distal bearings 96 and the access opening 111 is configured to receive the first bolt 94 or the second bolt 95. In one embodiment, the access opening 111 may be configured to allow the first bolt 94 or the second bolt 95 to pass therethrough. The supplemental recess 110 may be provided to allow an end 80a of drive shaft 80, and optionally a portion of a proximal bearing 84, to rotate without contacting a corresponding shoulder.

The belt recess 105 is configured to receive a corresponding one of the pair of belts 56. As exemplarily shown in FIG. 7, the sidewall 105a of the belt recess 105 is set slightly apart from the sidewalls 107a and 109a of the distal and proximal bearing recesses 107 and 109, respectively, to minimize or eliminate any contact that the belt 56 may have with the shoulder. In other embodiments, however, the sidewall 105a of the belt recess 105 may coincide with one or more of the sidewalls 107a and 109a of the proximal bearing recesses 107 and 109. In embodiments where the guard 108 is incorporated within the powerhead assembly 14, a portion of the belt recess 105 (i.e., a recessed portion of the belt recess 105 defined by the recessed sidewall 105c and the recessed terminal surface 105d) may be provided to receive at least a portion of the guard 108.

Within the fastened shoulders 22 and 24 the belt recess 105, distal bearing recesses 107, proximal bearing recesses 109 and access openings 111 are dimensioned to substantially prevent travel of the components they are configured to receive so that the components of the drive assembly 58 are held in essentially a proper spatial relation relative to one another while still allowing movement of the components (e.g., rotation of the drive shaft 80, rotation of the split-arbor, lateral motion of the belts 56, etc.), even when the rotatable implement 16 is not present. Accordingly, in one embodiment, the belt recess 105, distal bearing recesses 107, proximal bearing recesses 109, and access openings 111 are dimensioned to substantially conform to the exterior shapes of corresponding components they are configured to receive. In another embodiment, the belt recess 105, distal bearing recesses 107, proximal bearing recesses 109, and access openings 111 are dimensioned to at least partially conform to the exterior shapes of corresponding components they are configured to receive.

In the example embodiment shown in FIGS. 5 and 8, the output shaft 50 includes a first gear 52 configured to be intermeshed with a second gear 54 disposed on the drive shaft 80. The second gear 54 may be coupled through the drive shaft 80 to the belts 56 and be configured to transmit torque to a split-arbor (exemplarily illustrated as including a pair of arbor halves 90). Although the first gear 52 and the second gear 54 are illustrated as bevel gears, it will be appreciated that the first gear 52 and the second gear 54 may be provided as any type of gears capable of intermeshing at angles between 0 degrees and 180 degrees. Although FIGS. 5 and 8 illustrate only a first gear 52 and a second gear 54 to transmit rotational motion from the output shaft 50 to the drive shaft 80, it will be appreciated that any number (and type) of gears or other devices may be provided as desired to transmit rotational motion from the output shaft 50 to the drive shaft 80. Further, although FIGS. 5 and 8 illustrate only a first gear 52 and a second gear 54 to transmit rotational motion from the output shaft 50 to the drive shaft 80, it will be appreciated that the first gear 52 and/or the second gear 54 may be replaced by any other type of rotatable fitting configured to change the speed or direction of a transmitted rotation (e.g., a wheel, sprocket, etc.).

Referring to FIG. 8, the drive shaft 80 includes a pair of gear portions 82. Each gear portion 82 may generally define any type of gear that can engage a belt 56. Each gear portion 82 is located between a corresponding end 80a of the drive shaft 80, and a belt-support surface 82a. Any of the belt-support surface 82a may be provided by a flange 83 (e.g., as with the lower-illustrated support surface 82a) or by any other suitable structure (e.g., as with a surface of the second gear 54). Ends 80a of the drive shaft 80 are receivable within bearing bores 84a defined within the proximal bearings 84. Although FIG. 8 illustrates the drive shaft 80, the gear portions 82, flange 83 and second gear 54 as being integrally formed together, one or more of the aforementioned components may be provided as a separate components, detachable from other components.

In one embodiment, a belt 56 may be securely engaged with a gear portion 82 of the drive shaft 80 by mounting or engaging the belt 56 on a belt-support surface 82a and then inserting a corresponding end 80a of the drive shaft 80 into a bearing bore 84a of a proximal bearing 84. In another embodiment, an end 80a of the drive shaft 80 may be inserted into a bearing bore 84a of a proximal bearing 84 and then the belt 56 may be wrapped around a corresponding gear portion 82 between the proximal bearing 84 and the belt-support surface 82a. When assembled, travel of the belt 56 along the longitudinal axis of the drive shaft 80 is prevented by the belt-support surface 82a on the drive shaft 80 and a corresponding bearing 84. Although FIG. 8 illustrates the drive shaft 80 and proximal bearings 84 as separate, detachable components, the drive shaft 80 and one or more of the proximal bearings 84 may be permanently attached together.

The split-arbor includes a first arbor half 90a and a second arbor half 90b (collectively referred to as a pair of arbor halves 90). Each of the arbor halves 90a and 90b includes a gear portion 98, a head portion 100 and an arbor bore 102 extending through the gear portion 98 and the head portion 100. Each gear portion 98 may generally define any type of gear that can engage a belt 56. Although shown here as being the same size as the gear portions 82, the gear portions 98 may have more or fewer teeth, which has the effect of driving the pair of arbor halves 90 faster or slower than the drive shaft 80. The head portion 100 may include an implement-engaging surface 100a and a belt-support surface 100b. In one embodiment, the arbor bore 102 of one or both of the arbor halves 90 may be chamfered at the implement-engaging surface 100a and/or the belt-support surface 100b to facilitate insertion of the first bolt 94 and/or second bolt 95 into the respective arbor halves 90. The arbor bore 102 of the second arbor half 90b may be threaded to receive the first bolt 94 and the second bolt 95. The arbor bore 102 of the first arbor half 90a may be threaded or unthreaded. In embodiments where the arbor bore 102 of the first arbor half 90a is threaded, the first bolt 94 can be pulled to maintain a space between the implement-engaging surfaces 100a within which the rotatable implement 16 can be inserted. Although FIG. 8 illustrates the gear portion 98 and head portion 100 as being integrally formed together, the gear portion 98 and head portion 100 may be provided as separate components detachable from each other.

Generally, the first bolt 94 and the second bolt 95 are configured to be inserted through the bearing bores 96a of the pairs of distal bearings 96 and the through the arbor bores 102 of the pair of arbor halves 90. In one embodiment, the first bolt 94 is configured to be inserted completely through a bearing bore 96a of one of the pair of distal bearings 96, completely through the arbor bores 102 of the first arbor half 90a, and threadedly engage threads in the arbor bore 102 of the second arbor half 90b. The second bolt 95 is configured to be completely inserted into the bearing bore 96a of the other of the pair of distal bearings 96 and partially through the arbor bore 102 of the second arbor half 90b in the opposite direction of the first bolt 94.

In one embodiment, a belt 56 may be securely engaged with a gear portion 98 of an arbor half 90 by providing the belt 56 on the belt-support surface 100a, placing a distal bearing 96 adjacent to the gear portion 98 and belt 56, and then inserting the first bolt 94 completely through the bearing bore 96a of one of the pair of distal bearings 96 and into the arbor bore 102 of the first arbor half 90a (or by inserting the second bolt 95 completely through the bearing bore 96a of the other of the pair of distal bearings 96 and into the arbor bore 102 of the second arbor half 90b). In another embodiment, the first bolt 94 or second bolt 95 may be inserted into the bearing bore 96a of a distal bearing 96 and into the arbor bore of one of the pair of arbor halves 90 and then the belt 56 may be wrapped around a corresponding gear portion 98 between the distal bearing 96 and the belt-support surface 100a of the corresponding arbor half. When assembled, travel of the belt 56 along the longitudinal axis of the first bolt 94 or second bolt 95 is prevented by the belt-support surface 100a of the head portion 100 and a corresponding distal bearing 96. Although FIG. 6 illustrates each arbor half 90 as separate and detachable from the distal bearings 96, one or both of the arbor halves 90 may be permanently attached to a corresponding distal bearing 96. Although FIG. 6 illustrates each of the distal bearings 96 as separate and detachable from the first bolt 94 or the second bolt 95, one or both of the distal bearings 96 may be permanently attached to the first bolt 94 or the second bolt 95.

Although the drive assembly 58 has been discussed above as including gear portions 82 and 98 and toothed belts 56, it will be appreciated that the one or more of the gear portions 82 and 98 may be replaced by any other type of rotatable fitting configured to change the speed or direction of a transmitted rotation (e.g., a wheel, sprocket, etc.) Likewise, one or more of the toothed belts 56 maybe replaced by any other type of linkage configured to engage with a rotatable fitting (e.g., a non-toothed belt, a perforated belt, a roller chain, etc.).

In one embodiment, the belts 56 may be eliminated altogether and a direct gear drive may be used by incorporating the second gear 54 with the split-arbor. For example, the second gear 54 may be formed integral with or operably coupled to an arbor half 90. In such an embodiment, the proximal bearings 84 and the drive shaft 80 may also be eliminated.

In another embodiment, the belts 56 may be eliminated altogether and an odd number of intermediary rotatable fittings (e.g., gears, when gear portions 82 and 98 are included) to transmit rotational motion at the drive shaft 80 to the split-arbor.

Generally, the rotatable implement 16 can be secured between the implement-engaging surfaces 100a of the pair of arbor halves 90 by first ensuring that the first bolt 94 does not extend completely through the implement-engaging surfaces 100a of the split-arbor (i.e., by ensuring that a space exists between the implement-engaging surfaces 100a of the split-arbor). Subsequently, the rotatable implement 16 is inserted between the implement-engaging surfaces 100a of the split-arbor such that a central aperture of the rotatable implement 16 is aligned with the first bolt 94. The first bolt 94 is then inserted through the central aperture of the rotatable implement 16 from the arbor bore 102 of the first arbor half 90a, and into the arbor bore 102 of the second arbor half 90b (i.e., to "close" the space between the implement-engaging surfaces 100a of the split-arbor with the first bolt 94). By tightening the first bolt 94 within the arbor bore 102 of the second arbor half 90b, the bearings 96 are pulled toward each other and the rotatable implement 16 is compressed between the implement-engaging surfaces 100a of the split-arbor. By securing the first bolt 94 within the arbor bore 102 of the second arbor half 90b as described above by, for instance tightly engaging the threads of the first bolt 94 with the threads of arbor bore 102 of second arbor half 90b, the rotatable implement 16 can be immovably fixed within the split-arbor, even when the split-arbor is rotated and even when the rotatable implement 16 is working on a workpiece.

Once secured, the rotatable implement 16 can be removed from between the implement-engaging surfaces 100a of the split-arbor by loosening and removing the first bolt 94 from the arbor bore 102 of the second arbor half 90b, thereby opening the space between the implement-engaging surfaces 100a of the split-arbor thus allowing the rotatable implement 16 to be removed from the powerhead assembly 14.

A suitable tool, such as an Allen wrench or blade screwdriver, may be used to tighten or loosen the first bolt 94. Similarly, a suitable tool, such as an Allen wrench or blade screwdriver, may be used to engage the second bolt 95 and prevent the second arbor half 90b from rotating while the first bolt 94 is being tightened or loosened within the arbor bore of the second arbor half 90b.

In one embodiment, the second bolt 95 may be substantially prevented from rotating within the arbor bore 102 of the second arbor half 90b when the first bolt 94 is tightened or loosened from the arbor bore 102 of the second arbor half 90b simply by tightening the second bolt 95 within the arbor bore 102 of the second arbor half 90b more than the first bolt 94. In another embodiment, an adhesive may be applied to the threads of the second bolt 95 (and/or a portion of the arbor bore 102 of the second arbor half 90b receiving the second bolt 95) to adhere the second bolt 95 to the second arbor half 90b. In yet another embodiment, the second bolt 95 may be substantially prevented from rotating within the arbor bore 102 of the second arbor half 90b when the first bolt 94 is tightened or loosened from the arbor bore 102 of the second arbor half 90b simply by providing the first bolt 94 and the second bolt 95 to have different threading directions. For example, the first bolt 94 may have a left-handed thread and the second bolt 95 may have a right-handed thread, or vice-versa.

It will be appreciated by one of ordinary skill in the art, that the rotatable implement 16 can be secured between the implement-engaging surfaces 100a of the split-arbor before or after the drive assembly 58 is assembled, and before or after the drive assembly 58 is securely retained between the shoulders 22 and 24. For example, and with reference to FIG. 5, a rotatable implement 16 may be secured within the drive assembly 58 after the drive assembly 58 is securely retained between the shoulders 22 and 24 by engaging the first bolt 94 through the access opening 111 formed in shoulder 22 (e.g., with a suitable tool) to remove the first bolt 94 from the arbor bore 102 of the second arbor half 90b and open the space between the implement-engaging surfaces 100a of the split-arbor. The second bolt 95 may also be engaged with a suitable tool through the access opening 111 in the shoulder 24 to prevent the second arbor half 90b from rotating. A rotatable implement 16 can then be inserted between the implement-engaging surfaces 100a of the split-arbor such that the central aperture of the rotatable implement 16 is aligned with the arbor bores 102 of the pair of arbor halves 90. The first bolt 94 is then engaged through the access opening 111 formed in shoulder 22 (e.g., with a suitable tool) to re-insert the first bolt 94 into the arbor bore 102 of the second arbor half 90b. Again, the second bolt 95 may be engaged with a suitable tool through the access opening 111 in the shoulder 24 to prevent the second arbor half 90*b* from rotating. Thus, the rotatable implement 16 can be conveniently inserted and removed from the powerhead assembly 14 without decoupling the shoulders 22, 24 and without disassembling the drive assembly 58.

Figure 4:
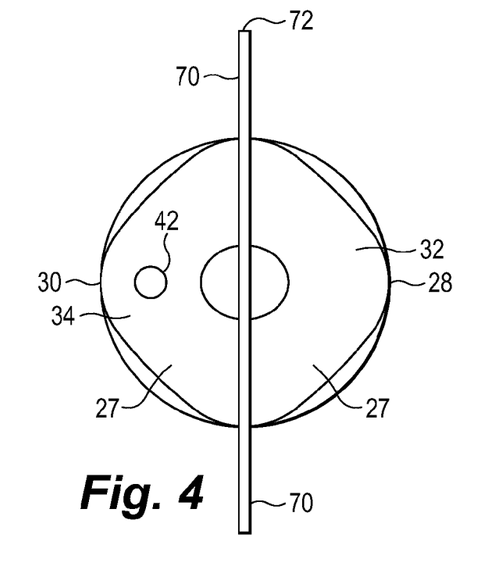
FIG. 4 illustrates a front plan view of the handheld power tool shown in FIG. 1A.

In another embodiment, and as shown in FIG. 4, a port 42 may be provided in the end 34 of shoulder 24. Although not shown, port 42 may be provided in the end 32 of shoulder 22 in addition to or as an alternative to the port 42 provided in the end 34 of shoulder 24. A user can insert a tool, such as a pin, into port 42 to prevent rotation of tool 10 when applying torque to the first bolt 94 and/or second bolt 95 to tighten or loosen it within one or more arbor halves 90 of the split-arbor. For example, a pin inserted into port 42 shown in FIG. 4 may engage with a hole (not shown) in the first arbor half 90*a* and/or second arbor half 90*b* to prevent rotation of the split-arbor.

Figure 9:
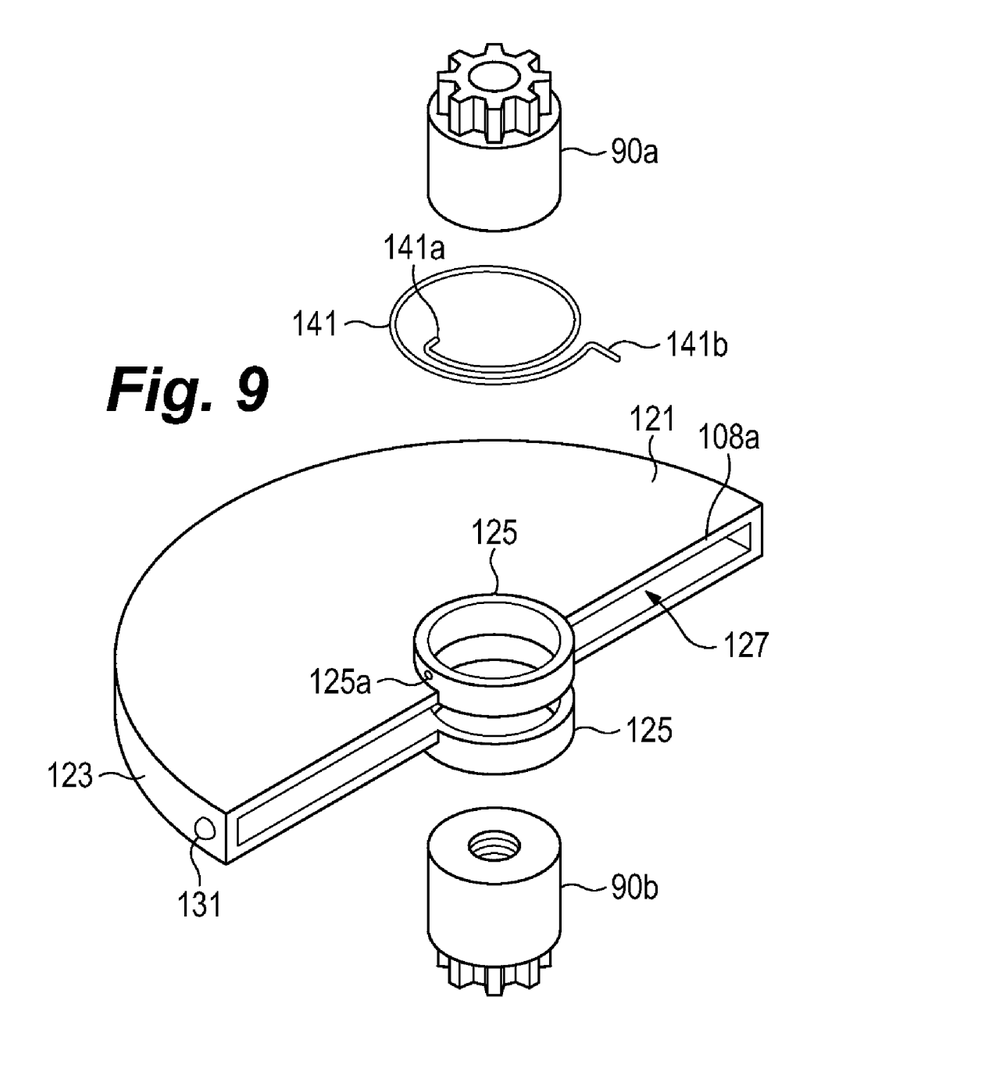
FIG. 9 illustrates a perspective exploded view of the guard shown in FIG. 5 along with a portion of the drive assembly shown in FIG. 8.

Referring to the embodiment shown in FIG. 5, a guard 108 is incorporated within the powerhead assembly 14 and is disposed adjacent to the rotatable implement 16 to provide a tool 10 as shown in FIG. 1B. In another embodiment, however, the guard 108 may be omitted to provide a tool 10 as shown in FIG. 1A. As shown in FIGS. 5 and 9, the guard 108 generally includes a pair of side protection members 121, a peripheral protection member 123, and a pair of attachment rings 125. The pair of side protection members 121 and the peripheral protection member 123 form an implement-receiving space or slot 127 capable of receiving at least a portion of the rotatable implement 16. As shown, each side protection member 121 is generally shaped as a semicircular annulus. However, the side protection members 121 may have any shape as desired to guard the rotational implement 16. The peripheral protection member 123 connects the side protection members 121 at the outer peripheral edges thereof. Although two side protection members 121 are illustrated, it will be appreciated that the guard 108 may have only one side protection member 121.

Each attachment ring 125 is coupled a corresponding side protection member 121 at the inner peripheral edge thereof. Each attachment ring 125 is also configured to receive the head portion 100 of a corresponding arbor half 90 such that the head portion 100 of an arbor half 90 is rotatable within the corresponding attachment ring 125. In one embodiment, each side protection member 121 may be supported by the terminal surface 103*b* of a slot trench 103 formed in a corresponding one of the shoulders 22, 24. Each side protection member 121 may also be supported by the slot trench-forming surface 113*a* of the island 113 formed in a corresponding one of the shoulders 22, 24. In another embodiment, the recessed portion of the belt recess 105 defined by the recessed sidewall 105*c* and the recessed terminal surface 105*d* is configured to receive at least a portion of a corresponding attachment ring 125 when an arbor half 90 is received within the attachment ring 125. For example, the recessed terminal surface 105*d* of the belt recess 105 may be configured to support a portion of a corresponding attachment ring 125 when an arbor half 90 is received within the attachment ring 125. In another embodiment, the recessed surface 113*c* of the island 113 may be configured to support a portion of a corresponding attachment ring 125 when an arbor half 90 is received within the attachment ring 125.

According to some embodiments, the guard 108 is rotatable relative to the shoulders 22, 24 when the shoulders 22, 24 are coupled together via the fasteners 40. In one embodiment, the terminal surface 103*b* of each trench slot 103 may press against a corresponding side protection member 121 when the shoulders 22, 24 are coupled together via the fasteners 40 to allow the guard 108 to be rotated (e.g., by a user of the tool 10) and to hold the guard 108 in place after being rotated.

In another embodiment, opposing surfaces of at least one of the side protection members 121 and/or peripheral protection member 123 and a sidewall 103*a* and/or terminal surface 103*b* and/or island 113 may be provided with a detent mechanism to divide rotation of the guard 108 into discrete increments. For example, a protrusion 131 may be formed on an exterior surface of the peripheral protection member 123 (see FIGS. 5 and 9) while a plurality of recesses 133 configured to receive a portion of the protrusion 131 may be formed in the exterior surface of the sidewall 103*a* of shoulder 22 (see FIG. 5). Although the FIGS. illustrate protrusions 131 on the guard and recesses 133 on the shoulder 22, the protrusions 131 may additionally or alternatively be formed on shoulder 22 and/or 24. Similarly, the recesses 133 may additionally or alternatively be formed on shoulder 22 and/or guard 108.

In yet another embodiment, a spring may be coupled between the guard 108 and one or more of the shoulders 22, 24 to bias the guard 108 to a predetermined position after it has been rotated (e.g., upon contact with a work piece during operation of the tool 10). For example, a spring may be provided as a spring 141 connected between an attachment ring 125 and a sidewall 103*a* of the slot trench 103 at the distal end of shoulder 24 (i.e., the end of the shoulder 24 that is farthest away from the motive source 12). The spring 141 in some embodiments is a roll of a pre-stressed metal strip wound around one of the attachment rings 125, wherein an inner end 141*a* of the spring 141 is attachable to the attachment ring 125 (e.g., within a corresponding aperture 125*a*) and the outer end 141*b* of the spring 141 is attachable to the sidewall 103*a* of the slot trench 103 at the distal end of shoulder 24 (e.g., within a corresponding aperture, not shown). In one embodiment, the spring 141 may be connected to the attachment ring 125 and the sidewall 103*a* such that the leading edge 108*a* of the guard 108 is provided in a in a neutral orientation (e.g., where the leading edge 108*a* is substantially parallel to the longitudinal axis 15 of the motive source 12) when the guard 108 is substantially unbiased by the spring 141. Thus, the spring 141 may bias the guard 108 at least substantially to the neutral orientation if the leading edge 108*a* of the guard 108 is rotated upwards and/or downwards relative to the neutral orientation. In another embodiment, an additional spring 141 may be provided so that both attachment rings 125 are coupled to a respective spring 141 and receive a biasing force from a respective spring. In one embodiment, the aforementioned detent mechanism is not used in conjunction with the spring 141.

According to other embodiments, however, the guard 108 may be positionally fixed relative to the shoulders 22, 24 when the shoulders 22, 24 are coupled together. In one embodiment, each side protection member 121 of the guard 108 may be integrally formed with a corresponding shoulder 22, 24. In such an embodiment, the peripheral protection member 123 (or portion thereof) may be integrally formed with one or more of the side protection members 121. This embodiment permanently guards the user from contacting the rotational implement 16 on the portion covered by the guard 108.

Rotatable implement 16 may take a variety of forms. In the examples shown in FIGS. 1A-5, rotatable implement 16 includes two opposing abrasive surfaces 70 defined by a non-toothed peripheral edge 72. In other examples, rotatable implement 16 may comprise a toothed blade with or without one or more abrasive surfaces. Rotatable implement 16 may also take the form of a brush, or any suitable configuration.

Tool 10 may be provided with a dust collection system (not pictured) for reducing the amount of dust created while operating on a workpiece with tool 10. Reducing the amount of dust may limit the amount of dust inhaled by a user and reduce dust accumulation on surrounding surfaces. Dust collection systems for power tools are known in the art and any suitable dust collection system may be used. A collection receptacle with an inlet, such as a bag with an opening, that is subject to negative pressure, such as via a vacuum, may serve as a suitable dust collection system.

The handheld power tool disclosure set forth above encompasses multiple distinct inventions with independent utility. While each of these inventions has been disclosed in a particular form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties rotatable implement 16 disclosed herein. Where the disclosure or subsequently filed claims recite "a" or "a disclosure or claims may be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present handheld power tool disclosure.

What is claimed is:

1. A powerhead assembly for a handheld power tool including a motive source and being configured to rotate an implement, the powerhead assembly comprising:
    a housing having a slot defined therein and configured to receive the implement; and
    a drive assembly retained within the housing and being operably couplable to the motive source, the drive assembly including:
    a first arbor piece, and
    a second arbor piece separate from the first arbor piece, wherein the first and second arbor pieces are configured to compress the implement from opposite sides of the slot; and
    wherein the drive assembly is configured to drive the first arbor piece separately from the second arbor piece.

2. The powerhead assembly of claim 1, wherein each of the first and second arbor pieces comprises an implement-engaging surface and an arbor bore and wherein the arbor bore of the second arbor piece is threaded, the drive assembly further comprising:
    a first threaded bolt configured to extend through the arbor bore of the first arbor piece and threadedly engage the arbor bore of the second arbor piece; and
    a second threaded bolt configured to threadedly engage the arbor bore of the second arbor piece from a side of the second arbor piece opposite the first threaded bolt,
    wherein the implement is structured to be compressed between the first arbor piece and the second arbor piece when the first bolt threadedly engages the arbor bore of the second arbor piece.

3. The powerhead assembly of claim 2, wherein the first bolt is accessible from outside the housing.

4. The powerhead assembly of claim 3, wherein the housing comprises:
    a first shoulder structured to retain a first portion of the drive assembly; and
    a second shoulder separate from the first shoulder and structured to retain a second portion of the drive assembly.

5. The powerhead assembly of claim 1, wherein the first and second arbor pieces are configured to rotate in the same direction about an axis of rotation of the implement in conjunction with the rotatable implement when the drive assembly is operably coupled to the motive source.

6. The powerhead assembly of claim 1, wherein the drive assembly further comprises a bearing contacting a first end of one of the first and second arbor pieces, wherein a second end of the one of the first and second arbor pieces is configured to contact the implement.

7. The powerhead assembly of claim 1, further comprising a guard at least partially covering the implement.

8. The powerhead assembly of claim 6, wherein the guard is rotatable about the implement axis.

9. The powerhead assembly of claim 7, further comprising a spring coupled to the guard and the housing.

10. A handheld power tool configured to rotate an implement, comprising:
    a motive source; and
    a powerhead assembly operably coupled to the motive source, the powerhead assembly including
        a housing having a slot defined therein, wherein the slot is configured to receive the implement,
        a drive assembly retained within the interior of the housing and being operably coupled to the motive source, the drive assembly having:
            a first arbor piece, and
            a second arbor piece separate from the first arbor piece,
        wherein the first and second arbor pieces are configured to compress the implement from opposite sides of the slot; and
        wherein the drive assembly is configured to drive the first arbor piece separately from the second arbor piece.

11. The hand held powered tool of claim 10, wherein the motive source is at least one selected from the group consisting of a pneumatic motive source, an VAC motive source and a VDC motive source.

12. The hand held powered tool of claim 10, including an actuation trigger, the trigger having a distal end terminating in a hook.

13. A handheld tool for spinning a tool blade, comprising:
    an elongated body generally sized to be held by a human hand;
    a motive source disposed within the elongated body; and
    a toolhead structured to couple to the elongated body, the toolhead including:
        a drive axle set between a pair of opposed bearings, the drive axle including a mechanical connection to the motive source and structured to rotate when the motive source is energized,
        a first and a second toothed drive belt each respectively coupled to first and second drive belt receivers in a first and second split-arbor,
        a first split arbor coupled to the first mechanical connector and structured to be driven by the drive axle, a second split arbor coupled to the second mechanical connector and structured to be driven by the drive axle, and a locking device structured to capture the tool blade between the first split arbor and the second split arbor.

14. The handheld tool of claim 13 in which the locking device comprises a threaded bolt structured to travel through the first split arbor and to threadedly engage the second split arbor.

15. The handheld tool of claim 14 in which the threaded bolt is also structured to travel through the tool blade.

16. The handheld tool of claim 13 in which each of the first and second split arbors are removably coupled to a respective bearing structured to be immovably set within a housing of the toolhead.

17. The handheld tool of claim 13, further comprising a rotatable blade guard structured to at least partially cover the tool blade.

18. The handheld tool of claim 17 in which the rotatable blade guard is slidably held in position by a housing of the toolhead.

* * * * *